United States Patent

[11] 3,615,437

[72] Inventors Peter Charles Richardson;
Peter John Hillson, both of Wealdstone, Harrow, England

[21] Appl. No. 694,847
[22] Filed Jan. 2, 1968
[45] Patented Oct. 26, 1971
[73] Assignee Eastman Kodak Company
Rochester, N.Y.
[32] Priority Jan. 5, 1967
[33] Great Britain
[31] 740/67

[54] LITHOGRAPHIC PRINTING PLATES
13 Claims, No Drawings

[52] U.S. Cl. .......... 96/29 L, 96/33, 101/459
[51] Int. Cl. .......... G03c 5/54, G03f 7/02
[50] Field of Search .......... 96/29 L; 204/17

[56] References Cited

UNITED STATES PATENTS 2,977,244 3/1961 Kay et al. .......... 106/1

FOREIGN PATENTS 440,736 1/1936 Great Britain .......... 96/29

OTHER REFERENCES

A. Rott and L. De Haes, Journal of Photo. Society, Vol. 8, 1960, pps. 26- 32

J. M. C. Dukes, Printed Circuits, Macdonald London 1961 pps. 46–47

P. Hartsuch, " Chemistry of Lithography," Lithographic Technical Foundation, N.Y., N.Y., 1952 pps. 152- 155

*Primary Examiner*—Norman G. Torchin
*Assistant Examiner*—John Winkelman
*Attorneys*—William H. J. Kline, Paul R. Holmes and Dwight J. Holter

ABSTRACT: Lithographic printing plates and methods for the preparation thereof wherein an oleophilic metal, e.g. copper, overlayer is selectively electrodeposited on image areas formed by silver salt diffusion transfer on a hydrophilic metal, e.g. aluminum, base. Press life of the metal baseplates is significantly increased by the deposition of the overlayer.

LITHOGRAPHIC PRINTING PLATES

This invention relates to lithographic printing plates, products and processes associated with the treatment of lithographic printing plates and materials resulting from such treatment of lithographic printing plates. In one aspect this invention relates to methods and materials for treating lithographic printing plates having a metallic base, for example, of aluminum and an image of a second metal, for example, silver deposited on the base. In another aspect this invention relates to materials resulting from the treatment of lithographic plates having a metallic base and an image of a second metal deposited on the base.

Lithographic printing in general involves the utilization of printing plates which are substantially planar in nature. The printing is most often conducted using a greasy printing ink. The effectiveness of the printing process depends upon a portion of the printing plate surface being substantially hydrophilic in nature and another portion, usually the image areas, being substantially hydrophobic in nature. The greasy printing ink is picked up by the hydrophobic areas of the plate and is transferred from these areas to a receiving member for subsequent transfer, e.g., in offset printing, or simply to the receiving sheet to form the resultant reproduction.

In using lithographic reproduction systems for making short runs, i.e., of a few hundred copies up to a thousand copies, it is quite common to use a paper base printing plate. Where many thousands of copies are required, it is desirable to use a more substantial type of printing plate, e.g., a metallic base printing plate, e.g., of type described in Hepher et al. in U.S. Pat. No. 3,161,508 issued Dec. 15, 1964. From such metallic base printing plates, e.g., of aluminum or zinc sheet, frequently as many as 5–25,000 copies may be made. The latter figure has heretofore been recognized as the maximum number of acceptable copies that could be made from any one such plate. Frequently, if press runs of greater than about 25,000 are intended, the press operator has been forced to shut down the press to change plates. This loss of press time, shut down time, has somewhat inhibited the consumer appeal for such plates. Therefore, continual efforts are being conducted to discover plates which have relatively long press life but which are comparatively simple to prepare.

According to the present invention, the press life of metal base printing plates of the type described above can be significantly increased by the application of adherent metal coating to the image areas of the printing plate.

Metal plates that may be employed as backing material or support for the printing plates of the invention are, for example, of aluminum or zinc and their surfaces may be grained or converted to a compound of the metal to render the surface hydrophilic. The image may be formed by the diffusion transfer process wherein the image would comprise "-precipitated" silver. Such plates bearing silver images may be produced according to the disclosure of U.S. Pat. No. 3,161,508, the disclosure of which is incorporated herein by reference. As well as the nucleated anodic aluminum plates specified therein there may also be used nucleated aluminum plates bearing a thicker coating of anodic aluminum oxide, for example, the anodic layer may be formed at a rate of at least 2.5 g./m.$^2$ in an anodic bath comprising sulfuric acid.

In a preferred embodiment of our invention, a sheet or foil of aluminum and its top surface, i.e., the surface which bears the image, is grained and/or converted to a compound of the metal to render the surface hydrophilic, e.g., anodic oxide or silicate, and the image material is silver and is formed by the silver salt diffusion transfer process. The silver image according to the present invention is covered with a metallic layer, such as a brass, nickel, zinc, or copper. Surprisingly, this layer may be applied using electrodeposition techniques. Where the base is aluminum or grained aluminum the image, e.g. silver image, is in electrical contact therewith and by selecting an appropriate voltage, e.g. about 0.5 volt and advantageously from about 0.3 to about 2.5 volts and plating for a period of from 0.5 to 5 minutes, the metal for the covering layer, e.g., copper, is deposited in a coherent form on the image but not on the aluminum base. In a preferred form of the invention the base is aluminum covered by a coating of anodic aluminum oxide. Again, by selecting the appropriate voltage in the electroplating bath, copper is deposited on silver image areas but not on the nonimage areas.

In order to improve the amount of electrical contact between the silver image areas and the metal base in the cases where the base is covered by a layer of anodic oxide (or in general to facilitate the electrodeposition), various thermal, mechanical and chemical treatments of the anodic layer may be utilized. Such treatments comprise, for example, heating the anodized foil to a temperature of 300°–400° C. and cooling, immersing in boiling water, treating with acids or alkalis, treating with solutions of certain metal salts and pulling and bending the foil over a sharp edge either during or after anodizing. The exact effect of these treatments is not known but they apparently increase the electrical conductivity of the anodic layer by increasing the number of surface defects (pores) or incorporating a conductive material in the anodic layer.

The metal of the base may itself be laminated to another material if desired, for example, to paper, cardboard or sheeting or film of polymeric material, e.g., polyethylene terephthalate or cellulose acetate. Also, in referring to particular metals, it is contemplated that the term encompasses the relatively pure metal as well as commonly used alloys having similar characteristics.

After the silver image has been covered by copper, brass, nickel or zinc, the plate may be prepared for the press, for example, by methods well known in the art. Particularly the covered image may be treated with a compound which has affinity for the covered image but not for the base and which improves the oleophilic properties of the image. Particularly advantageous techniques are disclosed in the previously mentioned Hepher et al., U.S. Pat. No. 3,161,508.

In the negative material advantageously utilized in the present invention, the surface of the developer resistant base on which the emulsion is coated is at least impermeable enough to the liquid developer to prevent any significant quantity of developer being absorbed from the emulsion layer during transfer of the silver salt. The base should satisfy the following test:

a 5½-inch square of the base under test is sealed to 6-inch square of cellulose acetate film with three-fourth-inch wide cellophane tape in such a way as to leave exposed a 5-inch square of that surface of the base on which the emulsion is to be coated. The back surface and edges of the test piece are thus protected from the test solution. This is 12 g./l. sodium hydroxide in water at a temperature from 18° to 24° C. The sealed test piece is weighed, immersed in the test solution for 5 seconds, and allowed to drain in a vertical position for a further 10 seconds. It is then blotted between two sheets of blotting paper for about 15 seconds until no free liquid can be seen on it. It is reweighed exactly one minute after immersion and is found to have gained, if at all, less than 0.10 grams in weight, preferably not more than 0.005 grams.

The developer resistant base in the negative material may have a developer resistant coating on one or both sides of the base; if on one side, the emulsion layer is on that side. Advantageously, the developer resistant base comprises a layer of a water-impermeable polyolefin, such as polyethylene or polypropylene, on a paper support. It is usually necessary to provide a satisfactory subbing or other treatment to the surface of the polyolefin to enable the coated emulsion to adhere to it and we prefer a treatment comprising an electronic bombardment preferably using a high-voltage corona discharge.

The advantages of the present invention are intended to be illustrated but not limited by the following examples.

EXAMPLE 1

A. Preparation of the Negative

Paper base weighing 135 g./m.$^2$ was first made developer resistant by applying to the face side a coating of pigmented polyethylene (Union Carbide resin DFD–3201 white 47) at the rate of 15 g./m/X.$^2$ and on the wire side a coating of polyethylene (Union Carbide resin DGDA–7501 natural) at the rate of 10 g./m.$^2$. This base gained less than 0.005 grams in the test defined above. The coating on the face side was made hydrophilic by subjecting it to a high-voltage corona discharge. The hydrophilic side was then coated with an orthosensitized high contrast silver chloride emulsion at a rate equivalent to 1.5 g./m.$^2$ $AgNO_3$, the gelatin content of the emulsion being 4.5 g./m.$^2$. The emulsion also contained formaldehyde as hardening agent. The resultant negative material was exposed to an image.

B. Preparation of the Receiving Sheet

A silver sol is prepared by the classical Carey Lea method and is well washed and finally diluted to 1 gram in 100 ml. of distilled water. A sheet of aluminum 0.005 inches thick and anodized to an aluminum oxide thickness of 0.5 –0.7 g./m.$^2$ is bathed in this solution, the excess removed and the sheet dried.

C. Preparation of the Plate

The exposed negative and a sheet of 0.005 inches brush-grained aluminum foil anodized to a weight of 2.5 g./m.$^2$ and nucleated as described in example 1B above were passed together but not in contact through the developer solution having the following composition:

| | |
|---|---|
| Hydroquinone | 15 grams |
| Phenidone | 1 gram |
| Sodium hydroxide | 13 grams |
| Sodium sulfite, anhydrous | 75 grams |
| Sodium thiosulfate | 8 grams |
| Potassium bromide | 0.35 gram |
| Carboxymethlhydroxyethyl Cellulose | 5 grams |
| Water to | 1 liter |

The negative and nucleated foil were squeezed together and separated after 60 seconds. The aluminum plate now bearing a silver image was then rinsed with distilled water and placed in a copper plating bath having the following composition:

| | |
|---|---|
| Cupric sulfate | 44.0 grams |
| Rochelle salt | 62.5 grams |
| Water to | 1000.0 ml. |
| Ammonium hydroxide (0.380) | to pH 7 |

With the cathode connected to the aluminum base and with a copper anode, plating was effected with strong agitation of the electrolyte for 5 minutes at a potential of 1.5 volts giving a current density of approximately 0.25 amps/dm$^2$.

The aluminum plate bearing a silver image covered with a layer of copper about 0.7 micron in thickness (the nonimage areas being free of copper) was rinsed with distilled water, treated with a 5 percent solution of 1-octyl-1,2,3,4,5-tetrahydro-1,3,5-triazine-4thiol in ethanol and then gummed with a 5 percent aqueous gum arabic solution.

D. Control

A similar plate was prepared by an identical process to 1C. except that the copper plating step was omitted and both plates were printed side by side on a Rotaprint 40/80 press.

The number of acceptable copies obtained from the copper plated plate was 7.5 times greater than the number obtained from the unplated control.

EXAMPLE 2

The procedure of example 1 was followed except that instead of the described copper plating step the aluminum plate bearing the silver image was nickel plated at 20° C. for 2 minutes at 2 volts giving a current density of 0.06 amps/dm$^2$ with an agitated bath of the following composition:

| | |
|---|---|
| Nickel sulfate ($NiSO_4 6H_2O$) | 70 grams/liter |
| Ammonium Chloride ($NH_4Cl$) | 5 grams/liter |
| Ammonium hydroxide (0.880) | to pH 7.6 |

A plate bearing a silver image coated with nickel was obtained.

EXAMPLE 3

The sheet of brush-grained anodized aluminum foil similar to that used in example 1 was given the following treatment prior to nucleation. The foil was immersed for 12 seconds in a 5 percent by volume aqueous solution of 88 percent orthophosphoric acid at 20° C. After rinsing in distilled water the foil was immersed in a 5 percent by weight aqueous solution of ferric ammonium oxalate at 85° C. for 1 minute. The foil was then washed in distilled water, nucleated, provided with a silver image by diffusion transfer and copper plated as described in example 1, except that a potential of 1 volt was used instead of 1.5 volts. An aluminum plate bearing a silver image coated with copper was obtained.

EXAMPLE 4

A sheet of brush-grained aluminum foil of 99.5 percent purity was anodized in a bath of 20 percent volume $H_2SO_4$ at 40° C. using a potential of 2 volts and a current density varying over the range 45–90 amps/sq. m. for 30 seconds. The foil was removed from the bath and pulled and bent over a sharp edge through an angle of 90°. The foil was then returned to the bath and anodizing continued under the same conditions for a further 30 seconds. The foil was nucleated and a silver image formed thereon as described in example 1. The silver image was then copper electroplated using the same bath and conditions as in example 1 except that a plating potential of 0.6 volts were used. An aluminum plate bearing a silver image coated with copper was obtained.

EXAMPLE 5

A sheet of brush-grained aluminum foil of 99.5 percent purity was anodized in a bath of 50 percent $H_3PO_4$ at 35° C. at a potential of 2 volts and a current density of 2.5 amps./dm$^2$ for 1 minute. A silver image was then formed thereon and plated with copper as described in example 1.

The invention has been described in detail with particular reference to preferred embodiments thereof, but it will be understood that variations and modifications can be effected within the spirit and scope of the invention as described hereinabove and as defined in the appended claims.

We claim:

1. A lithographic printing plate comprising a hydrophilic metal base, on the base (1) an image comprising a silver layer in intimate contact with the base formed by a silver salt diffusion transfer process, and (2) an oleophilic metallic layer formed by electrodeposition in intimate contact with and corresponding to the silver layer and forming an oleophilic overlayer on the silver image.

2. The lithographic plate of claim 1 wherein said hydrophilic metal base comprises a metal selected from the group consisting of aluminum and zinc.

3. The lithographic plate of claim 2 wherein the hydrophilic metal base comprises aluminum coated with a thin layer of aluminum oxide and the oleophilic metallic layer comprises copper.

4. The lithographic plate of claim 2 wherein said oleophilic metallic layer comprises oleophilic copper.

5. The lithographic plate of claim 2 wherein said oleophilic metallic layer comprises oleophilic nickel.

6. The lithographic plate of claim 2 wherein said oleophilic metallic layer comprises oleophilic zinc.

7. The lithographic plate of claim 29 wherein said oleophilic metallic layer is formed by electrodeposition of a metal onto a silver layer followed by contacting said metallic layer with a compound conferring oleophilic properties to said metallic layer.

8. A method for producing lithographic printing plates comprising the steps of:

a. forming a silver image on a hydrophilic metallic support by silver salt diffusion transfer; and b. depositing an oleophilic metallic image on said silver image by electrodeposition, said oleophilic metallic image corresponding to the silver image and forming an oleophilic overlayer on the silver image.

9. The method of claim 8 wherein said metallic support comprises a metal selected from the group consisting of aluminum and zinc.

10. The method of claim 8 wherein said oleophilic image is composed of a oleophilic metal selected from the group consisting of copper, and nickel.

11. A method for producing lithographic printing plates comprising the steps of a. forming a silver image on a hydrophilic metallic support by silver salt diffusion transfer;

b. depositing a metallic image on said silver image by electrodeposition, said metallic image corresponding to the silver image and forming an overlayer on the silver image; and c. treating said metallic image to render said metallic image oleophilic by contacting said metallic image with a compound conferring oleophilic properties to said metallic image.

12. The method of claim 11 wherein said metallic support comprises a hydrophilic metal selected from the group consisting of aluminum and zinc.

13. The method of claim 11 wherein said metallic image is composed of a metal selected from the group consisting of copper, nickel and zinc.

* * * * *